(12) United States Patent
Evans

(10) Patent No.: US 10,781,145 B2
(45) Date of Patent: Sep. 22, 2020

(54) COMPOSITIONS FOR ENHANCING PLANT NUTRIENT UPTAKE AND METHOD OF THEIR USE

(71) Applicant: Bryan D. Evans, Olathe, KS (US)

(72) Inventor: Bryan D. Evans, Olathe, KS (US)

(73) Assignee: Bryan D. Evans, Olathe, KS (US)

( * ) Notice: Subject to any disclaimer, the term of this patent is extended or adjusted under 35 U.S.C. 154(b) by 221 days.

(21) Appl. No.: 15/758,672

(22) PCT Filed: Jul. 15, 2016

(86) PCT No.: PCT/US2016/042601
§ 371 (c)(1),
(2) Date: Mar. 8, 2018

(87) PCT Pub. No.: WO2017/011789
PCT Pub. Date: Jan. 19, 2017

(65) Prior Publication Data
US 2018/0258006 A1 Sep. 13, 2018

Related U.S. Application Data

(60) Provisional application No. 62/222,307, filed on Sep. 23, 2015, provisional application No. 62/193,288, filed on Jul. 16, 2015.

(51) Int. Cl.
*C05G 3/90* (2020.01)
*C05F 11/10* (2006.01)
(Continued)

(52) U.S. Cl.
CPC .............. *C05G 3/90* (2020.02); *A01N 37/44* (2013.01); *A01N 37/46* (2013.01); *C05B 17/00* (2013.01);
(Continued)

(58) Field of Classification Search
None
See application file for complete search history.

(56) References Cited

U.S. PATENT DOCUMENTS 4,877,447 A  10/1989 Suzuki et al.
5,580,840 A * 12/1996 Harms ................. C05G 3/0064
504/115
(Continued)

FOREIGN PATENT DOCUMENTS

CN   102381905 A   3/2012
CN   101503329 B   7/2012
(Continued)

OTHER PUBLICATIONS

Provisional U.S. Appl. No. 62/155,414, filed Apr. 30, 2015 (corresponding to US 2018/0305267 (Mohr)).*
(Continued)

*Primary Examiner* — Wayne A Langel
(74) *Attorney, Agent, or Firm* — Avant Law Group, LLC

(57) ABSTRACT

Compositions and methods for enhancing nutrient uptake in plants are disclosed. The primary ingredients of the disclosed compositions are (a) poly amino acids, such as tri-polyaspartic acid (TPA), and (b) citric acid. Another component, (c) L amino acids may also be included in the composition. The composition may be used to enhance fertilizer efficiency and to promote plant growth and/or yield.

23 Claims, 2 Drawing Sheets

Figure 1:
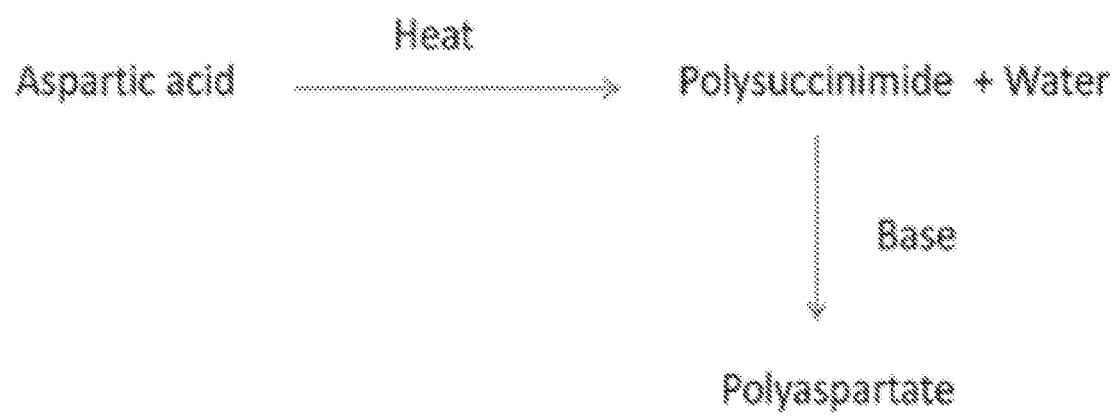

(51) Int. Cl.
*A01N 37/46* (2006.01)
*A01N 37/44* (2006.01)
*C05G 3/40* (2020.01)
*C05G 3/80* (2020.01)
*C05B 17/00* (2006.01)
*C05F 11/00* (2006.01)

(52) U.S. Cl.
CPC .............. *C05F 11/00* (2013.01); *C05F 11/10* (2013.01); *C05G 3/44* (2020.02); *C05G 3/80* (2020.02)

(56) References Cited

U.S. PATENT DOCUMENTS

| | | | |
|---|---|---|---|
| 5,814,582 | A | 9/1998 | Koskan |
| 5,861,356 | A | 1/1999 | Koskan et al. |
| 8,197,572 | B2 | 6/2012 | Wells |
| 8,357,221 | B2 | 1/2013 | King et al. |
| 2002/0129631 | A1 | 9/2002 | Carelli et al. |
| 2002/0165097 | A1* | 11/2002 | Sanders .................. C05G 3/80 504/361 |
| 2004/0038391 | A1 | 2/2004 | Pyntikov |
| 2009/0054241 | A1 | 2/2009 | Colucci et al. |
| 2011/0252847 | A1 | 10/2011 | Nasholm et al. |
| 2013/0303373 | A1* | 11/2013 | Quaghebeur .......... A01N 37/42 504/142 |
| 2013/0303377 | A1* | 11/2013 | Quaghebeur .......... A01N 37/44 504/272 |
| 2014/0007633 | A1* | 1/2014 | Tang .................. C05C 9/00 71/28 |
| 2016/0168041 | A1* | 6/2016 | McKnight ............... C05G 3/00 71/21 |
| 2016/0332929 | A1* | 11/2016 | McKnight ............... C05G 3/08 |
| 2018/0305267 | A1* | 10/2018 | Mohr ..................... C05F 11/00 |

FOREIGN PATENT DOCUMENTS

| | | | |
|---|---|---|---|
| CN | 102531764 A | 7/2012 | |
| CN | 104496696 | * 4/2015 | ........... C05G 3/0088 |
| CN | 104557294 | * 4/2015 | ............... C05D 9/02 |
| EP | 1153901 | * 7/2015 | ............... C05D 9/02 |

OTHER PUBLICATIONS

Chen, X et al., High Yield of Poly-Gamma-Glutamic Acid from Bacillius Subtilis by Solid-State Fermentation Using Swine Manure as the Basis of a Solid Substrate. Bioresource Technology, 2005, vol. 96; abstract; p. 1875, p. 1876, second paragraph: tables 4-5.

Qingdao Reach International Inc, High Content Amino Acid Organic Fertilizer Salt-Free for Agriculture, Sep. 2014 (retrieved Sep. 12, 2016). Retrieved from the Internet: <URL: http://fertilizertech.sell.everychina.com/p-100296743-high-content-amino-acid-organic-fertilizer-salt-free-for-agriculture.html>: p. 2, table.

PCT Application No. PCT/US16/42601, International Search Report and Written Opinion, dated Oct. 4, 2016, 12 pages.

* cited by examiner

COMPOSITIONS FOR ENHANCING PLANT NUTRIENT UPTAKE AND METHOD OF THEIR USE

RELATED APPLICATIONS

This application is the national phase of, and claims priority to, International Patent Application No. PCT/US16/42601, filed Jul. 15, 2016, which designated the U.S. and claims priority to U.S. Provisional Patent Application No. 62/193,288, filed Jul. 16, 2015 and U.S. Provisional Patent Application No. 62/222,307, filed Sep. 23, 2015. These applications are incorporated by reference into the present application in their entireties.

BACKGROUND

Fertilizers are used to promote plant growth and achieve higher yield in agriculture. Fertilizers are often formulated to provide nitrogen (N), phosphate (P) and/or potassium (K) in solid (granule or powder), or liquid forms. Typically, less than fifty percent of the fertilizers are absorbed by plants. In the case of phosphate, as little as 15% of the fertilizer may be absorbed. Unabsorbed fertilizers are not only an economic loss for farmers, but they may also cause undesirable changes to the quality of the soil.

U.S. Pat. No. 4,089,899 describes a solid, controlled release nitrogen fertilizer of the urea type, which consists of two nitrogen fractions: water-soluble nitrogen and cold water insoluble nitrogen.

U.S. Pat. No. 5,350,735 discloses ammoniacal nitrogen, nitrate nitrogen and urea nitrogen combined with poly (aspartic acid) to form a fertilizer that enhances uptake by plants.

U.S. patent application Ser. No. 13/427,239 discloses a slow-release nitrogen fertilizer composition that improves plant growth, which is incorporated by reference into this disclosure. The fertilizer composition disclosed in the '239 application comprises a water-insoluble slow-release nitrogen fertilizer and the water-soluble poly(amino acids), and salts thereof, disclosed in U.S. Pat. No. 5,350,735, in an amount sufficient to increase the period of release of nitrogen from said water-insoluble slow-release nitrogen fertilizer and/or to improve the growth of plants.

SUMMARY

The present disclosure advances the art by providing an improved composition for improving plant growth by enhancing nutrient uptake by a plant. In one embodiment, the disclosed composition may be applied directly to the soil or onto the leaves, stems and/or the roots of a plant. In another embodiment, the disclosed composition may be pre-mixed with a fertilizer before being applied to the plant. In one aspect, when fertilizers and the disclosed composition are applied separately to the plant, the disclosed composition may be applied to the plant before, after or at the same time when the fertilizers are applied.

In one embodiment, the disclosed composition may contain two active ingredients only: (a) a poly amino acid or derivative thereof, and (c) one or more L-amino acids. In another embodiment, the disclosed composition may contain, among others, ingredients: (a) a poly amino acid or derivative thereof, and (c) one or more L-amino acids. In another embodiment, the poly amino acid or derivative thereof is a nontoxic, environmentally safe, biodegradable polymer.

In another embodiment, the disclosed composition may contain, among others, ingredients: (a) a poly amino acid or derivative thereof, (b) citric acid, and (c) one or more L-amino acids. In another embodiment, the disclosed composition may contain two active ingredients only: (a) a poly amino acid or derivative thereof, and (b) citric acid. In one aspect, the weight ratio between (b) and (a) is in the range of between about 1:1 to about 1:20. In another aspect, the weight ratio between (b) and (a) is about 1:10. In another aspect, the composition may contain about 10% by weight of citric acid and about 90% by weight of a poly amino carboxylate.

The term "poly amino acid or derivative", as used herein, may include, but are not limited to poly(aspartic acid), poly(glutamic acid), poly(glycine), poly(lysine), a copolymer of cysteine and glutamic acid, poly amino carboxylate, or a terpolymer of cysteine, glutamic acid and aspartic acid and their derivative(s). In one aspect, the poly amino acids of this disclosure may be non-toxic and non-aromatic. In another aspect, the poly amino acid(s) of this disclosure may be bio-degradable. In another aspect, the poly amino acids may have at least about 15 repeating amino acid monomers and a molecular weight (MW) greater than 1,000 Daltons. In another aspect, the molecular weight of the poly amino acids of this disclosure is about 3,000 to 28,000 Daltons. In another aspect, the molecular weight of the poly amino acids of this disclosure is about 4,000 to 14,000 Daltons. In another aspect, the molecular weight of the poly amino acids of this disclosure is about 2,000 to 6,000 Daltons.

In one embodiment, the poly amino acid or derivative is a poly amino carboxylate. In another embodiment, the poly amino acid or derivative is tri-polyaspartic acid or thermal polyaspartate (TPA). In another embodiment, TPA may be prepared by first converting aspartic acid to polysuccinimide. No organic solvents are involved during the conversion and the only byproduct is water. In the second step, the polysuccinimide may be converted to polyaspartate in a base-mediated hydrolysis. FIG. 1 shows one embodiment of the synthesis of the tri-polyaspartic acid (a.k.a., polyaspartate, thermal polyaspartate or TPA) of this disclosure.

In another embodiment, when the disclosed composition is applied together with a liquid fertilizer, the amount of the disclosed composition to be used with the fertilizer may be approximately 0.5% to 10% by volume, 0.75% to 5% by volume, or about 1% by volume of a liquid fertilizer. In another embodiment, when the disclosed composition is applied together with a solid fertilizer, the amount of the disclosed composition to be used with the fertilizer may be approximately 1-10 quarts per ton, 3-5 quarts per ton, or about 3 quarts per ton of the solid fertilizer.

In another embodiment, the one or more L-amino acids may be pre-mixed before they are mixed with the poly amino acid or derivative. In another embodiment, the one or more L-amino acids may contain at least 2, 3, 4, 5, 6, 7, 8, 9, 10, 15, or 20 L-amino acids.

In another embodiment, the one or more L-amino acids may be produced by digesting one or more naturally existing proteins. In one aspect, the digestion may be conducted in the presence of an enzyme.

In another embodiment, the naturally existing proteins are prepared from cold-water fish, such as deep-sea fish from the temperate or polar regions.

In another embodiment, ingredient (a) poly amino acid or derivative and the ingredient (c) L-amino acids are present in the disclosed composition at a ratio of between 5:1 and 1:5 by weight. In another aspect, the ratio between (a) and (c) is between 4:1 and 1:1 by weight.

In another embodiment, the disclosed composition does not contain detectable amount of heavy metal. In another embodiment, the disclosed composition is substantially free of heavy metal.

In one aspect, ingredients (a) poly amino acid or derivative, (b) citric acid, and (c) one or more L-amino acids are mixed immediately before the disclosed composition is to be applied to a plant or the soil. In another aspect, ingredients (a), (b) and (c) are mixed and stored for at least one week before being applied to the plant or the soil.

In another aspect, ingredient (c) of the disclosed composition may contain at least 1%, 2%, 3%, 4%, 5%, or 6% leucine by molar ratio of total L-amino acids.

In another aspect, ingredient (c) of the disclosed composition may contain at least 1%, 2%, or 3% hydroxyproline by molar ratio of total L-amino acids.

In another aspect, ingredient (c) of the disclosed composition may contain at least 6%, 8%, 10%, or 12% taurine by molar ratio of total L-amino acids.

In another aspect, ingredient (c) of the disclosed composition may contain at least 6%, 8%, 10%, or 12% alanine by molar ratio of total L-amino acids.

In another aspect, ingredient (c) of the disclosed composition may contain at least 6%, 8%, 10%, or 12% glycine by molar ratio of total L-amino acids.

In one embodiment, the disclosed composition may further contain a non-ionic surfactant, such as long chain alcohols that exhibit surfactant properties. Examples of such surfactant may include but are not limited to fatty alcohols, cetyl alcohol, stearyl alcohol, and cetostearyl alcohol (consisting predominantly of cetyl and stearyl alcohols), and oleyl alcohol. Fatty alcohols are those alcohols derived from natural fats or oils.

BRIEF DESCRIPTION OF THE DRAWINS

Figure 2:
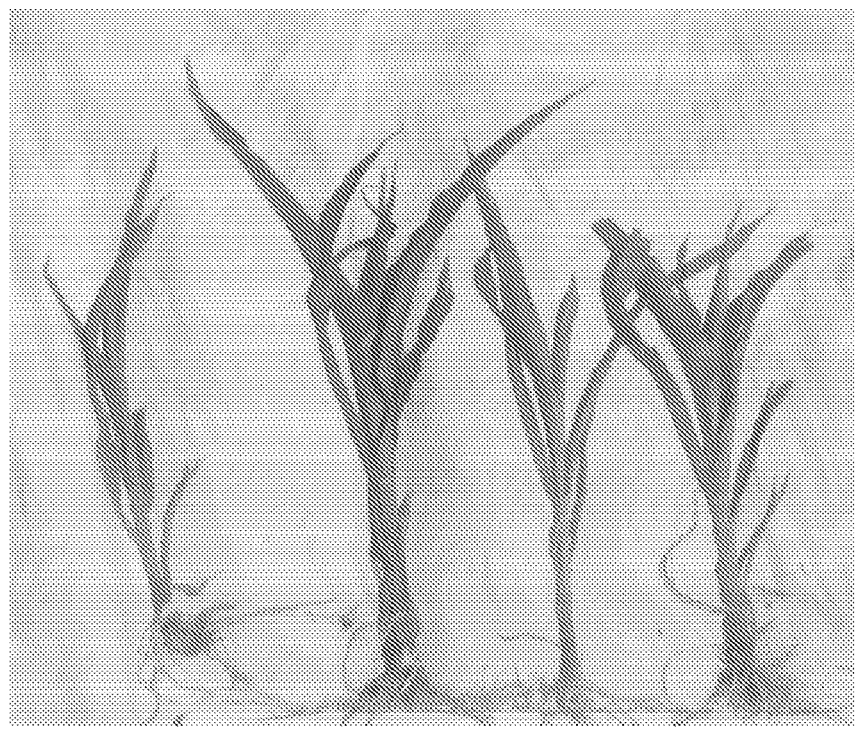

FIG. 1 shows one embodiment of how TPA is prepared.
FIG. 2 shows results from one experiment comparing the effects of the disclosed composition and a commercial product.

DETAILED DESCRIPTION

This disclosure provides an improved composition for enhancing nutrient uptake by plants. In one embodiment, the composition may contain (a) a poly amino acid or derivative, and (c) one or more L-amino acids. In another embodiment, the disclosed composition may contain, (a) a poly amino acid or derivative, (b) citric acid, and (c) one or more L-amino acids.

The disclosure also provides an improved method for increasing plant nutrient uptake by applying the disclosed compositions to a plant to enhance its nutrient uptake. In one aspect, the disclosed enhance composition may be mixed with conventional liquid fertilizer. In another aspect, it may also be sprayed on dry fertilizer which may then be applied to the soil/plants.

When TPA is applied to urea or liquid ammonia, it may increase the nitrogen efficiency. In one embodiment, the TPA may help retain the $NH_4$ in the fertilizer, thereby reducing the amount of nitrogen leaching in the soil. In one aspect, attaching $NH_4^+$ to TPA may result in lower degree of freedom, which may make it more difficult for Nitrosonomas bacteria to position itself to dock on $NH_4^+$ and conduct nitrification. This effect may slow down the conversion to $NO_2^-$, and the subsequent conversion to $NO_3^-$. Net result is N remains as $NH_4^+$ longer, which provides more time for the nitrogen to be taken in by the plants rather than leaching away.

In another aspect, attaching the $NH_4^+$ to TPA may result in lower state of chemical potential or energy. Assuming $NH_4^+$ and Nitrosonomas bacteria are both reactants and $NO_2^-$ and Nitrosonomas bacteria are the products and assuming this nitrification is a reaction, there is an activation complex of $NH_4^+$/Nitrosonomas bacteria. When the reactant energy level lowers, there is an increase of energy requirement to achieve the energy level of the activation complex. This increase in activation energy requirement may make it more difficult for the bacteria to convert $NH_4^+$ to $NO_2^-$. As a result, N remains as $NH_4^+$ for crop instead of leaching away as $NO_3^-$.

In another aspect, attaching $NH_4^+$ to TPA may immobilize $NH_4^+$. Immobilization of $NH_4^+$ may lead to lower probability for Nitrosonomas bacteria to come in contact with $NH_4^+$, which, in turn, may decrease the rate of $NH_4^+$ to $NO_2^-$ conversion.

In another embodiment, the one or more L-amino acids may promote root growth.

U.S. Pat. No. 542,080 reported that dilute citric acid may help make phosphate fertilizers more soluble. However, the citric acid may be quickly neutralized in the soil. In one embodiment of the present disclosure, the citric acid is used in conjunction with TPA, which together may help keep the phosphate in an available state for longer time period after being applied to soil. In one aspect, the phosphate may be maintained in an available state 2-6 months, or throughout the entire growth season of the plants.

In another embodiment, the disclosed compositions may help reducing phosphate leaching in the soil. In one aspect, by enhancing fertilizer efficiency, less phosphate fertilizers are needed to achieve the same yields. In another aspect, the disclosed composition may be particularly desirable in high phosphate-fixing soils. In another embodiment, soil may be tested prior to the use of the disclosed composition to determine the soil quality, for example, the levels of phosphate leaching in the soil. Depending upon the test results, high levels of phosphate leaching may indicate a need for applying the disclosed composition.

A number of embodiments of the present disclosure are listed below:

Item 1. A composition for improving growth of a plant, comprising
(a) a poly amino acid or derivative thereof, and
(b) a citric acid.

Item 2. The composition of Item 1, further comprising (c) one or more L-amino acids.

Item 3. The composition of any of the preceding Items, wherein the poly amino acid or derivative is a poly amino carboxylate.

Item 4. The composition of any of the preceding Items, wherein the poly amino acid or derivative is tri-polyaspartic acid (TPA).

Item 5. The composition of any of the preceding Items, wherein the weight ratio between (b) and (a) is in the range of between about 1:1 to about 1:20.

Item 6. The composition of any of the preceding Items, wherein the weight ratio between (b) and (a) is about 1:10.

Item 7. The composition of Item 2, wherein the L-amino acid is produced by enzymatically digesting one or more naturally existing proteins.

Item 8. The composition of Item 7, wherein the naturally existing proteins are prepared from cold-water fish.

Item 9. The composition of Item 2, wherein (a) and (c) are present in said composition at a ratio of between 5:1 and 1:5 by weight.

Item 10. The composition of Item 9, wherein the ratio between (a) and (c) is between 4:1 and 1:1 by weight.

Item 11. The composition of any of the preceding Items, wherein said composition is substantially free of heavy metal.

Item 12. The composition of any of the preceding Items, wherein (a) and (b) are mixed immediately before said composition is to be applied to said plant.

Item 13. The composition of any of Items 2-12, wherein (a), (b) and (c) are mixed immediately before said composition is to be applied to said plant.

Item 14. The composition of any of Item 2-13, wherein the one or more L-amino acids comprise at least 2% hydroxyproline by molar ratio.

Item 15. The composition of any of Item 2-14, wherein the one or more L-amino acids comprise at least 5% leucine by molar ratio.

Item 16. The composition of any of Item 2-15, wherein the one or more L-amino acids comprise at least 10% taurine by molar ratio.

Item 17. The composition of any of Item 2-16, wherein the one or more L-amino acids comprise at least 10% alanine by molar ratio.

Item 18. The composition of any of Item 2-17, wherein the one or more L-amino acids comprise at least 10% glycine by molar ratio.

Item 19. The composition of any of the preceding Items, further comprising a non-ionic surfactant.

Item 20. A method of enhancing nutrient uptake by a plant, comprising administering to the plant a composition comprising:
(a) a poly amino acid or derivative thereof, and
(b) a citric acid.

Item 21. The method of Item 20, wherein the composition further comprises (c) one or more L-amino acids.

Item 22. The method of any of Items 20-21, wherein the poly amino acid or derivative is tri-polyaspartic acid (TPA).

Item 23. The method of any of Items 20-22, wherein said composition is mixed with a fertilizer before being administered to the plant.

Item 24. The method of any of Items 20-23, wherein (a) and (b) are mixed immediately before said composition is to be applied to the plant.

Item 25. The method of any of Items 20-24, wherein (a), (b) and (c) are mixed immediately before said composition is to be applied to the plant.

The following examples are provided for purposes of illustration of embodiments only and are not intended to be limiting. The reagents, chemicals and instruments are presented as exemplary components or reagents, and various modifications may be made in view of the foregoing discussion within the scope of this disclosure. Unless otherwise specified in this disclosure, components, reagents, protocol, and other methods used in the system and the assays, as described in the Examples, are for the purpose of illustration only.

EXAMPLE 1

Field Test of the Effects of TPA/AA and TPA/AA/CA

Tripolyaspartic acid (TPA) was mixed with an amino acid product (AA) derived from cold water fish. Several TPA/AA products with different ratio between TPA and AA were prepared. These products were applied to plants and the effects of these products on nutrient uptake and yields are compared to those of controls. Three groups are tested: (I) 80% TPA/20% AA, (II) 62% TPA/38% AA and (III) 30% TPA/70% AA. TPA in this Example contained 47.0% (w/w) Copoly-{(3-carboxypropionamide) (2-(carboxymethyl acetamide)} as potassium Salt.

In another test, Tripolyaspartic acid (TPA) was mixed with an amino acid product (AA) and citric acid (CA). The weight ratio between CA and TPA was about 1:3.

With the combination of TPA, AA and CA, higher nutrient uptake may be achieved through more robust root growth, which may, in turn, lead to higher yields.

EXAMPLE 2

Field Test of the Effects of a Mixture of a Poly Amino Carboxylate and Citric Acid A poly amino carboxylate was mixed with citric acid (CA) and applied to plants along with phosphate. The effects of these products on nutrient uptake and yields are compared to those of controls, which include same amount of phosphate alone, and same amount of phosphate with a commercially available nutrient uptake enhancer. The results from 4 test groups are shown in FIG. 2: (1) no phosphate; (2) phosphate plus 90% poly amino carboxylate/10% CA, (3) phosphate alone and (4) phosphate plus a commercially available nutrient uptake enhancer. As shown in FIG. 2, Group (2) had the best results both in root system and overall growth of the plant.

Changes may be made in the above methods and compositions without departing from the spirit of the instant disclosure. It should be noted that the matter contained in the above description or shown in the accompanying drawings should be interpreted as illustrative and not in a limiting sense. Ratios and percentages provided in this disclosure are by weight unless otherwise specified. The following claims are intended to cover generic and specific features described herein, as well as statements of the scope of the present methods and compositions, which, as a matter of language, might be said to fall there between.

Although each of the embodiments described above has been illustrated with various components, it should be understood that the compositions and methods as described in the present disclosure may take on a variety of specific configurations or formulations and still remain within the spirit and scope of the present disclosure. Furthermore, suitable equivalents may be used in place of or in addition to the various components, the function and use of such substitute or additional components being held to be familiar to those skilled in the art and are therefore regarded as falling within the scope of the present disclosure.

All references cited in this disclosure, including patents, patent applications, scientific papers and other publications, are hereby incorporated by reference into this application.

I claim:

1. A composition for improving growth of a plant, comprising
(a) tri-polyaspartic acid (TPA), and
(b) a citric acid.

2. The composition of claim 1, further comprising (c) one or more L-amino acids.

3. The composition of claim 1, wherein the weight ratio between (b) and (a) is in the range of between about 1:1 to about 1:20.

4. The composition of claim 1, wherein the weight ratio between (b) and (a) is about 1:10.

5. The composition of claim 2, wherein the L-amino acid is produced by enzymatically digesting one or more naturally existing proteins.

6. The composition of claim 5, wherein the naturally existing proteins are prepared from cold-water fish.

7. The composition of claim 2, wherein (a) and (c) are present in said composition at a ratio of between 5:1 and 1:5 by weight.

8. The composition of claim 7, wherein the ratio between (a) and (c) is between 4:1 and 1:1 by weight.

9. The composition of claim 1, wherein said composition is substantially free of heavy metal.

10. The composition of claim 1, wherein (a) and (b) are mixed immediately before said composition is to be applied to said plant.

11. The composition of claim 2, wherein (a), (b) and (c) are mixed immediately before said composition is to be applied to said plant.

12. The composition of claim 2, wherein the one or more L-amino acids comprise at least 2% hydroxyproline by molar ratio.

13. The composition of claim 2, wherein the one or more L-amino acids comprise at least 5% leucine by molar ratio.

14. The composition of claim 2, wherein the one or more L-amino acids comprise at least 10% taurine by molar ratio.

15. The composition of claim 2, wherein the one or more L-amino acids comprise at least 10% alanine by molar ratio.

16. The composition of claim 2, wherein the one or more L-amino acids comprise at least 10% glycine by molar ratio.

17. The composition of claim 1, further comprising a non-ionic surfactant.

18. A method of enhancing nutrient uptake by a plant, comprising administering to the plant or to the soil around the plant a composition comprising:
    (a) tri-polyaspartic acid (TPA), and
    (b) a citric acid; and
    wherein the administrated composition maintains a phosphate in an available state for 2-6 months.

19. The method of claim 18, wherein the composition further comprises (c) one or more L-amino acids.

20. The method of claim 18, wherein said composition is mixed with a fertilizer before being administered to the plant or to the soil around the plant.

21. The method of claim 18, wherein (a) and (b) are mixed immediately before said composition is to be applied to the plant or to the soil around the plant.

22. The method of claim 19, wherein (a), (b) and (c) are mixed immediately before said composition is to be applied to the plant or to the soil around the plant.

23. A composition for improving growth of a plant, comprising
    (a) a poly amino carboxylate, and
    (b) a citric acid.

* * * * *